United States Patent
Yin et al.

(10) Patent No.: US 7,281,421 B2
(45) Date of Patent: Oct. 16, 2007

(54) PACKAGE FOR A TIRE PRESSURE SENSOR ASSEMBLY

(75) Inventors: Jeffrey Yin, Wheeling, IL (US); Jen-Huang A. Chiou, Libertyville, IL (US); John T. Meagher, Hawthorn Woods, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 224 days.

(21) Appl. No.: 11/144,549

(22) Filed: Jun. 3, 2005

(65) Prior Publication Data
US 2006/0272758 A1 Dec. 7, 2006

(51) Int. Cl.
*G01M 17/02* (2006.01)
(52) U.S. Cl. .................. 73/146.8; 73/146.5
(58) Field of Classification Search .......... 73/146, 73/146.2, 146.3, 146.4, 146.5, 146.8; 340/442, 340/445, 447
See application file for complete search history.

(56) References Cited

U.S. PATENT DOCUMENTS

| | | | |
|---|---|---|---|
| 4,734,674 A | 3/1988 | Thomas et al. | |
| 5,853,020 A | 12/1998 | Widner | |
| 6,005,480 A | 12/1999 | Banzhof et al. | |
| 6,031,450 A | 2/2000 | Huang | |
| 6,034,597 A | 3/2000 | Normann et al. | |
| 6,160,474 A * | 12/2000 | Tsunetomi et al. | 340/442 |
| 6,175,301 B1 | 1/2001 | Piesinger | |
| 6,472,243 B2 | 10/2002 | Gogoi et al. | |
| 6,647,772 B2 * | 11/2003 | Ito et al. | 73/146 |
| 6,672,150 B2 | 1/2004 | Delaporte et al. | |
| 6,722,409 B1 | 4/2004 | Martin | |
| 6,774,775 B2 * | 8/2004 | Ito | 340/442 |
| 6,966,227 B2 * | 11/2005 | Okubo et al. | 73/715 |
| 7,145,443 B2 * | 12/2006 | Ito et al. | 340/442 |
| 2002/0046599 A1 | 4/2002 | Chuang et al. | |
| 2003/0066343 A1 | 4/2003 | Fischer et al. | |
| 2004/0046649 A1 | 3/2004 | Sanchez et al. | |
| 2004/0155763 A1 | 8/2004 | Lin et al. | |
| 2005/0092076 A1 | 5/2005 | Uleski et al. | |

OTHER PUBLICATIONS

Schrader Electronics, "New Auto Rotation Technology", Ireland.

* cited by examiner

*Primary Examiner*—Andre J. Allen
(74) *Attorney, Agent, or Firm*—Gary J. Cunningham

(57) ABSTRACT

A tire pressure sensor assembly including a valve stem that can be preassembled and snap installed into a tire rim is disclosed. The tire pressure sensor assembly includes a valve stem and a printed circuit board configured with electronics for sensing tire pressure and transmitting radio frequency data related to tire pressure. The circuit board is rigidly connected to the valve stem. The valve stem and the electronics are contained in a unitary, integrated housing that is deformable to allow the valve stem portion of the assembly to be press fit into the rim opening. So installed, the assembly is securely mounted to the rim, but is no more time consuming to install than a conventional valve stem.

20 Claims, 3 Drawing Sheets

-PRIOR ART-

PACKAGE FOR A TIRE PRESSURE SENSOR ASSEMBLY

CROSS-REFERENCE TO RELATED APPLICATIONS

This application is related to U.S. patent application Ser. No. 11/144,992, filed concurrently herewith, entitled "Improved Tire Pressure Sensor Assembly," which is incorporated herein by reference in its entirety.

BACKGROUND OF THE INVENTION

1. Field of the Invention

The invention relates to a tire pressure sensor that is integrated in a single one-piece housing with a valve stem and which is mountable to a tire rim in one step.

2. Description of the Related Art

Electronic tire pressure sensors are becoming increasingly common in motor vehicles. Beginning Sep. 1, 2005, the National Highway Traffic Safety Administration (NHTSA) will phase in regulations that will require that manufacturers install tire pressure sensors in many passenger vehicles. See, e.g., Federal Motor Vehicle Safety Standards; Tire Pressure Monitoring Systems; Controls and Displays, 49 C.F.R. parts 571 and 585.

Various configurations for an electronic tire pressure sensor are described in the art, but most share the common basic features of: being coupleable to or part of a tire rim or a tire valve stem which fits into an opening in the rim to allow the tire to be filled with air; having an electronic pressure sensor for sensing the pressure in tire; and having a radio frequency (RF) transmitter for transmitting a radio signal indicative to the sensed pressure to the vehicle's computer. Such electronic tire pressure sensors are mounted inside the space between the tire and the rim and must be able to withstand the considerable g-forces that result from tire rotation. Most of the various configurations of tire pressure sensors in the art are the result of efforts to meet these requirements in ways that minimize the costs associated with the sensor systems and their installation. Various examples of electronic tire pressure sensors are described in U.S. Pat. Nos. 6,005,480, 5,853,020, 4,734,674, and 6,722,409, which are hereby incorporated by reference in their entireties.

A drawback to presently existing tire pressure sensors is that their installation requires an additional step beyond what is required to install a valve stem and/or valve stem assembly in a tire rim. For example, it is typical that the valve stem portion be first installed in the rim, and then the pressure sensor portion affixed to it in a separate step. As a further drawback, such schemes require the tire pressure sensor to comprise different pieces. It would be desirable to have an electronic tire pressure sensor that is as simple to install as a conventional valve stem, and which is fully integrated with the valve stem as a single piece. This disclosure provides such an embodiment.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Most conventional tire valve stems are jacketed in a deformable material and are installed in an opening in the tire rim before the tire is mounted on the rim. However, most conventional tire pressure sensors coupled to valve stems require additional installation steps and components beyond what is typical when merely assembling the valve stem into the rim. In short, such valve stem/pressure sensor assemblies cannot be easily installed as are traditional valve stems.

The present disclosure relates to a tire pressure sensor assembly that provides several advantages over sensors described in the prior art. In one embodiment, the sensor is provided as a single assembly integrated with the valve stem as a single piece that is installed within a tire by snapping or press-fitting the assembly into the valve stem opening of the tire rim before the tire is mounted on the rim. No further steps, e.g., bolting, screwing, etc., are required to install the sensor. Thus, the sensor is no more complicated or time consuming to install than a conventional valve stem assembly.

The assembly includes a valve stem and electronics that are configured to sense tire pressure and to transmit data related to tire pressure to the vehicle's computer (or other on-board receiver). According to one embodiment, the electronics are configured on a printed circuit board (PCB) and include a pressure sensor, a radio frequency transceiver, and a battery. According to one embodiment, the pressure sensor is configured such that the port of the sensor will face the inside of the tire rim when the sensor is installed in the rim, thereby decreasing the likelihood that the port will become clogged with debris. The electronics can also include a switch to direct the senor to take and transmit intermittent pressure readings, thus conserving battery life.

The tire pressure sensor assembly comprises a singular housing that includes a cavity section for holding the pressure sensor electronics and a valve stem section for containing a valve stem. The housing is made of a deformable material and is configured to form an airtight seal with the valve stem opening of the tire rim when inserted therethrough. The electronics can be secured in the housing, for example, by potting the PCB into the housing. The valve stem can be secured in the housing, for example, by press fit or by molding the valve stem into the housing. The PCB is rigidly connected to the valve stem, for example, by rigid metal leads. This connection provides rigidity to the assembly, thus allowing the assembly to withstand the high g-loading generated when the wheel is spinning; and allows the valve stem to function as an antenna for transmitting the RF data related to tire pressure.

Figure 1:
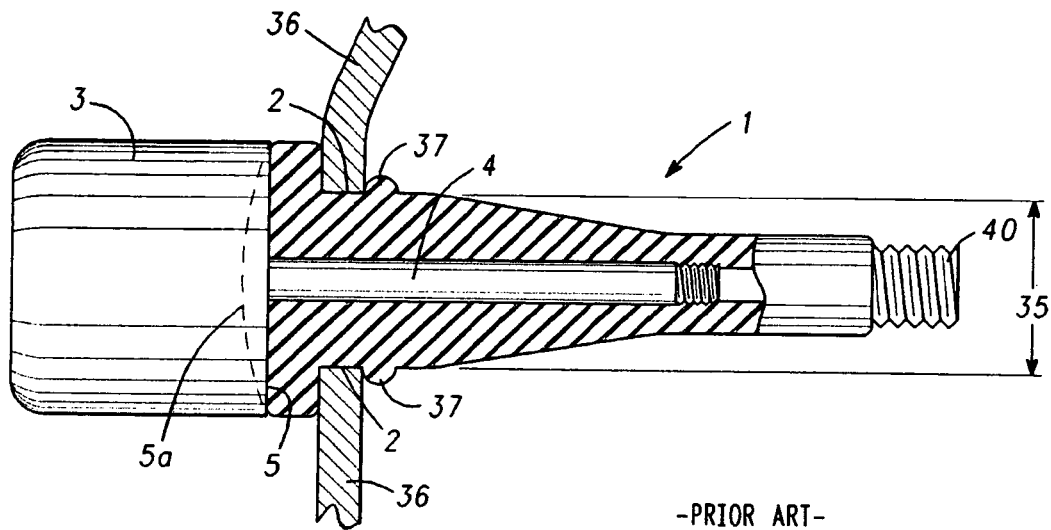
FIG. 1 illustrates a prior art tire pressure sensor that includes a valve stem section and a sensor section.

For example, FIG. 1 illustrates a stem-mounted tire pressure sensor that is described in the art. See U.S. Pat. No. 6,005,480 for a more detailed description of similar sensors. The sensor depicted in FIG. 1 uses a valve stem section 1 that is made of a deformable material such as a relatively hard rubber and is in most ways similar to a conventional valve stem. For example, valve stem section 1 comprises a nozzle 40 for introducing air into the tire, and which is normally threaded to receive a protective cap (not shown). (For clarity, the valve core, air passageway, and other aspects of the valve stem are not shown in this simplified illustration). Valve stem section 1 includes an annular sealing surface 2 shaped to seal the valve stem section 1 against the valve opening 35 in rim 36. Valve stem section 1 is installed in rim 36 by forcing deformable retaining protrusions 37 through the valve opening 35 to bring the opening 35 into alignment with the seating surface 2.

After the valve stem section 1 is seated in the rim 36, a rigid pressure sensor section 3 is then attached to valve stem section 1 via a nut 4, which screws into the interior of the valve stem section 1. Sensor section 3 contains the pressure sensing electronics, RF transmitter, and other components mentioned earlier. When affixed together in this manner, valve stem section 1 and sensor section 3 meet at interface 5.

One drawback to the sensor illustrated in FIG. 1 is that it requires at least two steps to mount into rim 36. First, the valve stem section 1 must be installed into the opening 35 in the rim 36, and then sensor section 2 must be attached to the now-installed valve stem section 1. Whereas it might take only a few seconds to install valve stem section 1 (similar to the time it takes to install a conventional valve stem), it can take minutes to install sensor section 2 because section 2 requires that the nut 4 be tightened with the appropriate torque. The accumulated time lost due to this extra step is significant in an assembly line setting. Another drawback to this design is that the assembly cannot be preassembled before it is installed into the rim 36. This is because valve section 1, being made of a deformable material, would tend to deform during installation through the rim opening, for example, as indicated by dashed line 5*a*. If the sensor section 2 were pre-affixed to the valve stem section 1 prior to installation into the rim 36, this deformation would tend to damage interface 5 between valve stem section 1 and sensor section 2. Similarly, a pre-affixed sensor section 2 would impede the deformability of the valve stem section 1.

Figure 2:
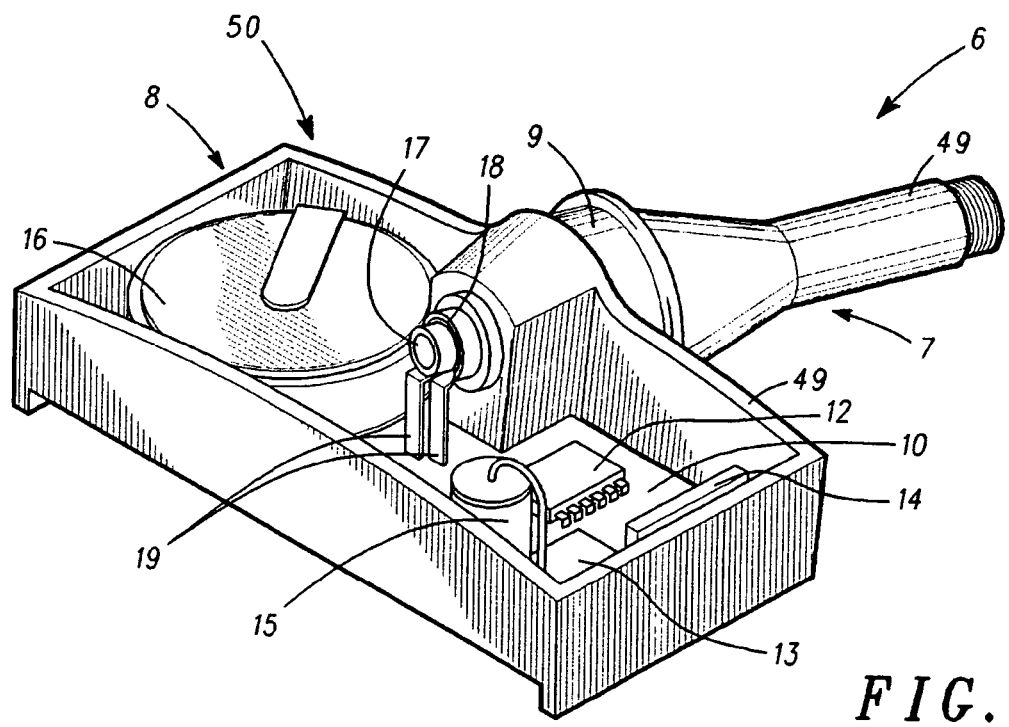
FIG. 2 illustrates a tire pressure sensor assembly having a housing containing a PCB with electronics for sensing tire pressure and transmitting RF data related to tire pressure and containing a valve stem, in which the PCB is rigidly attached to the valve stem.

An aspect of the present disclosure provides a tire pressure sensor that can be preassembled as a single assembly and installed into a rim in a single step, in a way similar to the assembly and installation of a conventional valve stem. An embodiment of the disclosed tire pressure sensor assembly 6 is illustrated in FIG. 2. The tire pressure sensor assembly 6 has a housing 49 that includes a valve stem section 7 and a sensor section 8 for housing the pressure sensor electronics. Having a single housing 49 to house both the valve stem and the pressure sensor electronics facilitates installation of the pressure sensor in a rim, which can now be installed simultaneously. Housing 49 is made of a deformable material, for example, rubber. Examples of suitable housing materials include ethylene propylene diene monomer (EPDM) and natural rubber.

Figure 3:
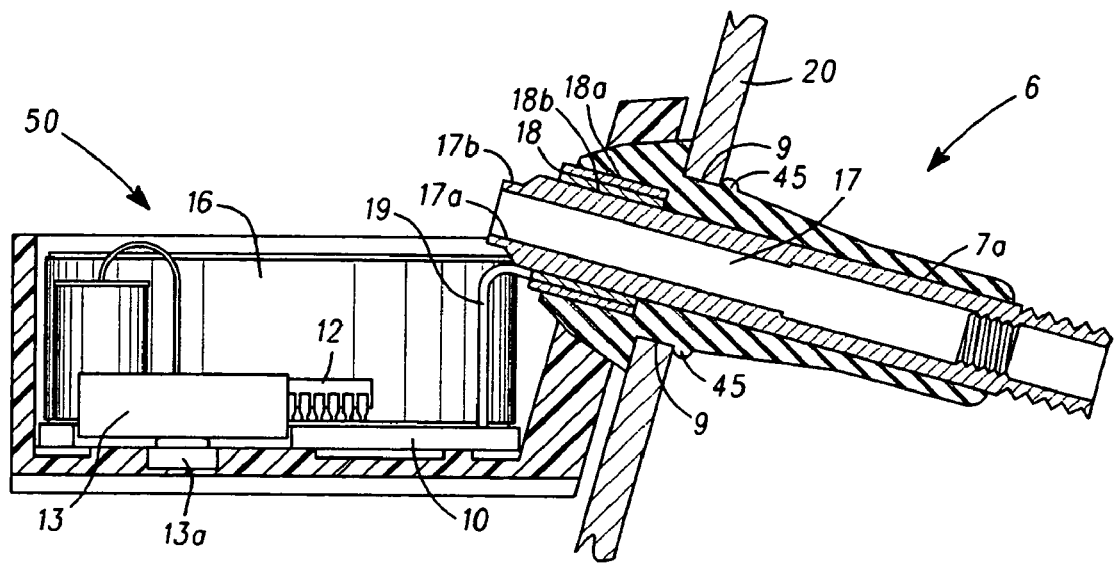
FIG. 3 illustrates the tire pressure sensor assembly of FIG. 2 mounted in a tire rim.

Valve stem section 7 contains a bore configured to contain a valve stem 17, as also shown in cross-section in FIG. 3. Valve stem section 7 typically has an annular sealing surface 9 shaped to seal the assembly 6 against the valve opening of a rim. Sensor section 8 comprises a cavity 50 configured to contain a printed circuit board (PCB) 10. PCB 10 can be mounted in cavity 50 of the sensor section 8 and can be secured in the cavity 50, for example, with a potting material, such as DP 105 Flexible Epoxy from 3M (St. Paul, Minn.).

PCB 10 supports an integrated circuit (IC) 12 for controlling components such as a pressure sensor 13, a RF transceiver 14, and a switch 15. Each of these components are known to one of skill in the art so are not described in detail here. Briefly, suitable pressure sensors include capacitive pressure sensors. Capacitive pressure sensors are available from several manufacturers, including VTI Technologies (Dearborn, Mich.). According to one embodiment, pressure sensor 13 is configured so that the port is at the bottom (i.e., facing the center of the rim) of the cavity 50 to prevent clogging. This is illustrated in more detail in FIG. 3, discussed further below. RF transceiver 14 is configured to transmit pressure readings to the vehicle's computer or to some other monitoring system in the vehicle. Switch 15 is provided so that pressure sensor assembly 6 is not continually active so that battery life is conserved. For example, the switch 15 can be configured so that the pressure sensor electronics are triggered to measure and transmit pressure readings at predetermined time intervals or as a function of change in centripetal force, etc. PCB 10 also includes a battery 16.

Still referring to FIG. 2, PCB 10 is connected valve stem 17 via leads 19. Leads 19 are preferably of high tensile strength suitable to provide rigidity to the sensor and not to deflect during high g-loading. An example of a suitable material for leads 19 is a beryllium copper spring element in a brass shell. According to the embodiment illustrated in FIG. 2, leads 19 are attached to valve stem 17 via cylindrical terminal 18. According to one embodiment, cylindrical terminal 18 is preferably a high contact force cylindrical terminal. Suitable terminals include Amphe-power RAD-SOK® terminals from Amhenol-Tuchel Electronics (Canton, Mich.). Further details concerning the interconnections between the valve stem, the leads, and the cylindrical terminal 18 are discussed below.

The configuration illustrated in FIG. 2 provides several advantages. For example, valve stem 17 is metallic, for example brass, and cylindrical terminal 18 provides electronic contact between valve stem 17 and PCB 10. This allows valve stem 17 to function as an antenna for RF transmission of data between pressure sensor assembly 6 and the vehicle's computer. Also, the connection between PCB 10 and valve stem 17 permits housing 49 and stem section 7 to axially deflect when the sensor is installed in a tire rim, as shown in more detail in FIG. 4, discussed below.

FIG. 3 illustrates a view of the tire pressure sensor assembly 6 as mounted in a tire rim 20. The sensor is seated in rim 20 such that an air-tight seal is formed between annular sealing surface 9 and rim 20. FIG. 3 illustrates an embodiment wherein pressure sensor 13 is mounted such that the port 13*a* of the sensor faces the center of the rim 20 to prevent clogging by debris. Centrifugal force is directed toward the circumference of the tire during motion and therefore directs debris away from port 13*a*.

FIG. 3 also illustrates interconnections of the various components, including PCB 10, valve stem 17, and stem section 7. The interface 7*a* between the outside surface of valve stem 17 and stem section 7 forms a tight seal. For example, the valve stem 17 can be molded into stem section 7. Alternatively, interface 7*a* can be formed as a tight press fit. As mentioned earlier, PCB 10 is attached to valve stem 17 via leads 19 via cylindrical terminal 18. Cylindrical terminal 18 and valve stem 17 meet at interface 18*b*. Interface 18*b* is a high contact force connection that is stable enough to resist angular deflection of the cavity section (including the PCB 10) during high g-loads while still providing electronic contact between cylindrical terminal 18 and valve stem 17. According to an alternative embodiment, leads 19 can attach directly to valve stem 17, for example by spot welding. Leads 19 can attach to the inner surface 17a or the outer surface 17b of valve stem 17.

Stem section 7 typically must deflect axially during installation into rim 20 (shown in more detail in FIG. 5). The embodiment illustrated in FIG. 3 permits such axial deflection by allowing valve stem 17 to slide with respect to with respect to housing 49. According to one embodiment, terminal 18 can slide relative to stem section 7 at interface 18a. Alternatively, valve stem 17 can slide with respect to terminal 18 at interface 18b. Movement at either or both of interfaces 18a and/or 18b can allow axial deflection during installation.

Figure 4A:
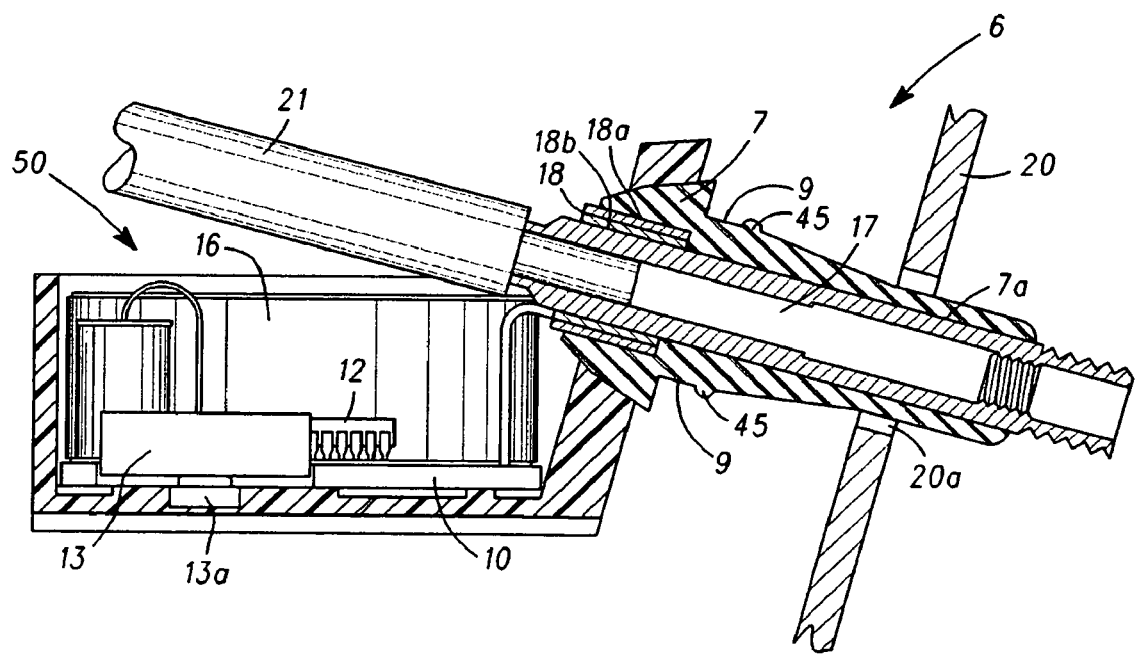
FIGS. 4A and 4B illustrates the installation of the tire pressure sensor assembly of FIG. 2 in a tire rim.
Figure 4B:
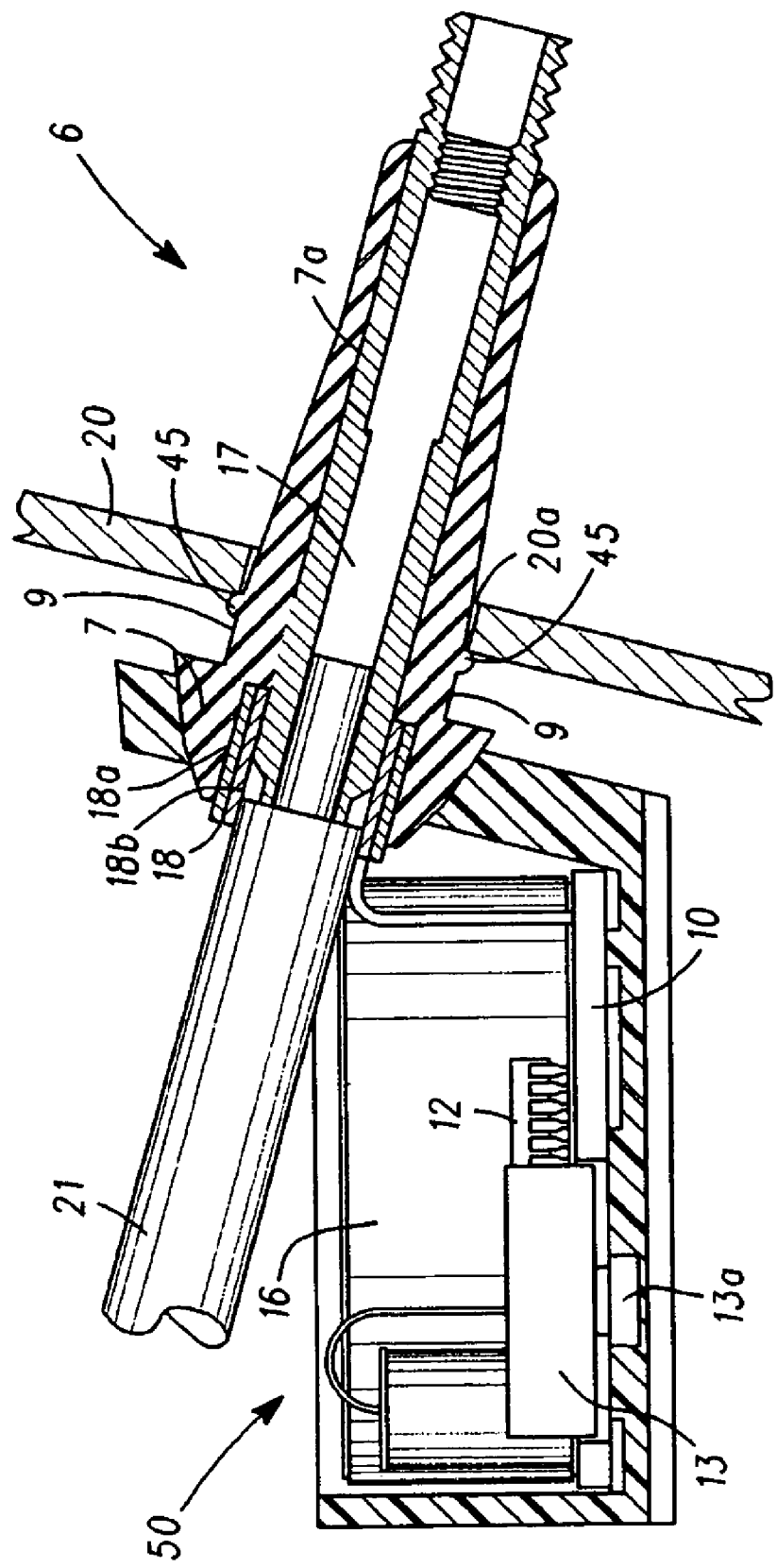

FIG. 4 illustrates installation of the disclosed tire pressure sensor 6 into an opening 20a in rim 20 using a pushing tool 21. FIG. 4A illustrates pre-installation equilibrium configuration in which force is not yet applied to the tool 21 to push the tire pressure sensor 6 into place. During installation as shown in FIG. 4B, the tool 21 is pushed to place a force on the valve stem 17 such that the upper portion of the valve stem section 7 axially deflects as housing 6 is forced through the opening 20a. Cylindrical terminal 18 slides on valve stem 17 at interface 18b to allow this axial deflection. Installation is continued until deformable retaining protrusions 45 are surpassed to bring annular sealing surface 9 into a sealing engagement with rim opening 20a, as shown in FIG. 3. Importantly, the installation illustrated in FIG. 5 does not require the sensor to be bolted or screwed into place and is therefore quick and efficient.

It should be understood that the inventive concepts disclosed herein are capable of many modifications. To the extent such modifications fall within the scope of the appended claims and their equivalents, they are intended to be covered by this patent.

We claim:

1. A tire pressure sensor assembly insertable into a rim opening of a tire, comprising:
    electronic components configured to read a pressure of the tire and to electromagnetically transmit tire pressure data;
    a valve stem for introducing air into the tire; and
    a unitary, integrated housing for containing the electronic components and the valve stem, the unitary, integrated housing including a deformable retaining protrusion being adapted to be press fittingly inserted through the opening during installation and an annular seating surface for providing a sealing engagement with the rim.

2. The tire pressure sensor assembly of claim 1, wherein the electronic components are on a printed circuit board, and wherein the printed circuit board is contained within a cavity in the housing.

3. The tire pressure sensor assembly of claim 2, wherein the cavity is filled with a potting material to secure the printed circuit board.

4. The tire pressure sensor assembly of claim 2, wherein the printed circuit board is affixed to the valve stem by at least one lead.

5. The tire pressure sensor assembly of claim 4, wherein the at least one lead prevents the printed circuit board from angularly deflecting when subject to centrifugal force of the tire when rotating.

6. The tire pressure sensor assembly of claim 4, wherein the at least one lead permits the sensor assembly to axially deflect when the sensor assembly is inserted into a tire rim.

7. The tire pressure sensor assembly of claim 4, wherein the at least one lead is electrically conductive and allows the valve stem to be used as an antenna.

8. The tire pressure sensor assembly of claim 4, wherein the at least one lead is connected to the valve stem via a cylindrical terminal concentric with the valve stem.

9. The tire pressure sensor assembly of claim 1, wherein the housing is formed of a deformable material.

10. The tire pressure sensor assembly of claim 1, wherein the housing contains an annular seating surface for firmly seating the assembly in the rim opening.

11. A tire pressure sensor assembly insertable into a rim of a tire, comprising:
    a printed circuit board containing electronic components configured to read a pressure of the tire and to electromagnetically transmit tire pressure data to a receiver in a vehicle;
    a valve stem for introducing air into the tire, wherein the printed circuit board is rigidly coupled to the valve stem; and
    a unitary, integrated housing for containing the electronic components and the valve stem, the unitary, integrated housing including a deformable retaining protrusion being adapted to be press fittingly inserted through the opening during installation and an annular seating surface for providing a sealing engagement with the rim.

12. The tire pressure sensor assembly of claim 11, wherein the printed circuit board is contained within a cavity in the housing, and wherein the cavity is filled with a potting material to secure the printed circuit board.

13. The tire pressure sensor assembly of claim 11, wherein the printed circuit board is coupled to the valve stem by at least one lead, and wherein the at least one lead prevents the printed circuit board from angularly deflecting when subject to centrifugal force of the tire when rotating.

14. The tire pressure sensor assembly of claim 13, wherein the at least one lead permits the sensor assembly to axially deflect when the sensor assembly is inserted into a tire rim.

15. The tire pressure sensor assembly of claim 13, wherein the at least one lead is electrically conductive and allows the valve stem to be used as an antenna.

16. The tire pressure sensor assembly of claim 11, wherein the housing is formed of a deformable material, and wherein the housing contains an annular seating surface for firmly seating the assembly in the rim opening.

17. A method of installing a tire pressure assembly into an opening in a tire rim, comprising:
    assembling a valve stem and a printed circuit board together;
    positioning the valve stem and the printed circuit board in a unitary, integrated housing, to form a complete tire pressure assembly; and
    mounting the complete tire pressure assembly to the rim by press fitting a deformable valve stem portion of the complete assembly through the opening in the rim.

18. The method of claim 17, wherein assembling a valve stem and a printed circuit board together to form a complete tire pressure assembly comprises positioning the valve stem and the printed circuit board in a unitary, integrated housing.

19. The method of claim 18, further comprising coupling the printed circuit board to the valve stem such that the printed circuit board does not angularly deflect under centrifugal acceleration.

20. The method of claim 19, wherein the tire pressure assembly axially deflects during installation.

* * * * *